United States Patent
Hasegawa et al.

(10) Patent No.: US 6,175,788 B1
(45) Date of Patent: Jan. 16, 2001

(54) FAILURE DIAGNOSIS METHOD FOR DUMP TRUCK AND DEVICE THEREFOR

(75) Inventors: Nobuki Hasegawa, Oyama; Yukio Sugano, Shiraoka-machi; Genichirou Watanabe, Oyama, all of (JP)

(73) Assignee: Komatsu Ltd., Tokyo (JP)

(*) Notice: Under 35 U.S.C. 154(b), the term of this patent shall be extended for 0 days.

(21) Appl. No.: 09/155,736

(22) PCT Filed: Apr. 3, 1997

(86) PCT No.: PCT/JP97/01156

§ 371 Date: Oct. 5, 1998

§ 102(e) Date: Oct. 5, 1998

(87) PCT Pub. No.: WO97/37870

PCT Pub. Date: Oct. 16, 1997

(30) Foreign Application Priority Data

Apr. 4, 1996 (JP) .................................................. 8-106472

(51) Int. Cl.[7] ................................ B60P 1/04; B60P 1/16; G01M 17/00
(52) U.S. Cl. ................................................ 701/29; 701/50
(58) Field of Search .................................. 701/50, 31, 29; 73/117.2, 117.3

(56) References Cited

U.S. PATENT DOCUMENTS

| | | | |
|---|---|---|---|
| 4,719,361 | * | 1/1988 | Brubaker ................................ 290/45 |
| 5,566,091 | * | 10/1996 | Schricker et al. ...................... 702/34 |
| 5,579,227 | * | 11/1996 | Simmons, Jr. et al. ................ 701/29 |
| 5,659,470 | * | 8/1997 | Goska et al. ........................... 701/35 |
| 5,754,965 | * | 5/1998 | Hagenbuch ............................. 701/35 |

FOREIGN PATENT DOCUMENTS

| | | |
|---|---|---|
| 3-48745 | 5/1991 | (JP) . |
| 3-235032 | 10/1991 | (JP) . |
| 4-304803 | 10/1992 | (JP) . |
| 6-342491 | 12/1994 | (JP) . |

* cited by examiner

*Primary Examiner*—Michael J. Zanelli
(74) *Attorney, Agent, or Firm*—Sidley & Austin

(57) ABSTRACT

It is possible to prevent generation of failure in a dump truck and to diagnose a true cause of failure in a short period of time. Thus the present failure diagnosis method diagnoses an operation and function of at least one of respective devices, such as an engine at a predetermined engine rotational speed, a transmission, respective axles, respective suspensions, hydro-pneumatic systems, and a brake while a vessel body (4) descends after evacuation of a load. The failure diagnosis device comprises body operating means (50) for raising or lowering a vessel body, a direction switching valve (7) for receiving a command from the body operating means to lower the vessel body, and a self-diagnosis control device (11) for using state detecting means (20) to detect and store a state of at least one of the respective devices at a predetermined engine rotational speed when the body operating means is at a predetermined operative position and for comparing a magnitude of a detected value and a rate of change with reference values on the basis of hysteresis data when carrying out failure diagnosis.

24 Claims, 3 Drawing Sheets

FAILURE DIAGNOSIS METHOD FOR DUMP TRUCK AND DEVICE THEREFOR

TECHNICAL FIELD

The present invention relates to a failure diagnosis method for industrial vehicles, such as dump trucks, and a device therefor.

BACKGROUND ART

In industrial vehicles, such as dump trucks, a reduction in the down time at the time of a failure is important; therefore, several conventional failure diagnosis apparatuses have been proposed. These failure diagnosis apparatuses are to diagnose which device or portion of a device fails when the vehicle develops any trouble. For example, they diagnose one by one whether or not operations and functions of respective sensors, respective actuators, respective controllers, and the like, are normal; and when an error is detected they use an indicator to inform an operator of the name of a failed part and a code number indicative of the kind of abnormality. Since the failed part with an error indication can be replaced or repaired, the recovery can be completed within a short period of time.

Such conventional failure diagnosis apparatuses may, however, cause a problem in that when a failure occurs intermittently without showing a continuous abnormal state, a true cause of the failure cannot be detected. In such a case, a cause of the failure or the failed part is guessed from the contents of the failure, and some recovery steps, such as a replacement of an associated part or sensor, are taken to recover from the failure. However, if the recovery steps are irrelevant, the part replacement must be repeated many times, and it takes a long time to diagnose a true cause of the failure. Such an extended idle time reduces the efficiency of the failure correction, causing a problem in that the down time cannot be reduced.

Further, recently there has been a strong demand to develop a failure diagnosis apparatus for use not only to correct a failure when an error occurs, but also to predict a failure before an error occurs, so as to prevent the generation of the failure and hence to reduce the down time. Such a failure diagnosis apparatus periodically diagnoses the states of respective devices, such as an engine, a transmission, axles, suspensions, hydro-pneumatic systems, and a brake, stores the diagnostic data as hysteresis, and predicts an occurrence of a failure on the basis of the hysteresis. In other words, it performs a so-called trend analysis. Even when a failure has occurred, the failure diagnosis apparatus can refer to the hysteresis data to diagnose a true cause of the failure.

However, the specific work of such periodic diagnoses requires an interruption of vehicle operations. This causes an undesirable reduction in the operating ratio of the vehicle, and hence is a hindrance to production efficiency. Therefore, it is desirable to provide a diagnosis method which is capable of being carried out without any interruption of vehicle operations. In this diagnosis method, the diagnostic data to be stored as hysteresis must be pertinent data which is capable of diagnosing an exact failure portion, i.e., capable of representing a state of a trend toward the generation of a failure.

SUMMARY OF THE INVENTION

The present invention has been made in consideration of such conventional problems, and an object thereof is to provide a failure diagnosis method for a dump truck and a device therefor, which is capable of preventing the generation of a failure and of diagnosing a true cause of failure in a short period of time.

In a first aspect of the present invention, there is provided a failure diagnosis method for a dump truck having a diagnosis device for diagnosing an operation and function of each device, such as an engine, a transmission, respective axles, respective suspensions, hydro-pneumatic systems or a brake, while a vessel body descends after the evacuation of a load from the vessel body, wherein an operation and function of at least one of the devices, such as the engine at a predetermined engine rotational speed, the transmission, the respective axles, the respective suspensions, the hydro-pneumatic systems, and the brake, are diagnosed during the descent of the vessel body.

According to this method, hydraulic circuit components, such as a hydraulic pump, are in a predetermined steady state while the vessel body descends after the completion of evacuating loaded material. Since a state of each device, such as the engine, the transmission, the axles, the suspensions, the hydraulic systems or the brake, is measured in the steady state, the diagnosis can always be made under identical conditions. Thus, the diagnostic data can represent an accurate state of the trend for each device. Therefore, it is possible to store the diagnostic data as hysteresis so as to diagnose the exact element which has failed. Further, since the diagnosis method does not require an interruption of normal vehicle operations, the production efficiency can be maintained without any reduction in the operating ratio of the vehicle.

In a second aspect of the present invention, there is provided a failure diagnosis device for a dump truck provided with a vessel body having a capacity for loading and evacuating material, the failure diagnosis device including state detecting means for detecting the temperature, the pressure, and the position of a device, such as an engine, a transmission, respective axles, respective suspensions, hydro-pneumatic systems, or a brake, such that an operation and function of each device can be diagnosed. The failure diagnosis device comprises body operating means for giving a command to raise or lower the vessel body, a direction switching valve for receiving the command from the body operating means to lower the vessel body, and a self-diagnosis control device for using the state detecting means to detect a state of at least one of the respective devices, out of the engine at a predetermined engine rotational speed, the transmission, the respective axles, the respective suspensions, the hydro-pneumatic systems, and the brake, when the body operating means is at a predetermined operative position, for storing a detected value as hysteresis data, and for comparing a magnitude of the detected value and a rate of change with reference values on the basis of the hysteresis data when carrying out a failure diagnosis of an operation and function of a respective device.

According to this device, when an operator sets the body operating means at a predetermined operative position (e.g., a float position or descending position) at the time of evacuation of a load from the vessel body, the direction switching valve, which is operative to control the raising and lowering of the vessel body, is switched to a position corresponding to the operative position to contract the hoist cylinders so that the vessel body will descend. At this time, since a hydraulic pump becomes a constant loaded state, the respective hydraulic components of a hydraulic circuit of the dump truck are in a steady, normal state. In this state, signals from the state detecting means for detecting the temperature, the pressure, and the position of each device, such as the engine, the transmission, the respective axles, the respective suspensions, the hydro-pneumatic systems, or the brake, are always measured, under identical conditions; and the measured data are inputted to the self-diagnosis control device. Thus, the diagnostic data, determined on the basis of the detected value from the state detecting means, can represent an accurate state of the trend for the respective device. The diagnostic data are stored as hysteresis, and a magnitude of the detected value and a rate of change thereof are compared with reference values on the basis of the hysteresis data. This makes it possible to diagnose the exact element which has failed. Further, since the diagnosis is carried out during a descent of the vessel body, there is no need to interrupt normal vehicle operations during the diagnosis, thereby maintaining the production efficiency without any reduction in the operating ratio of the vehicle.

In a third aspect of the present invention, there is provided a failure diagnosis device for a dump truck as set forth in the second aspect of the present invention, further comprising body descending start detecting means for detecting the start of a descent of the vessel body, wherein the self-diagnosis control device: uses the state detecting means to detect a state of at least one of the respective devices, such as the engine at a predetermined engine rotational speed, the transmission, the respective axles, the respective suspensions, the hydro-pneumatic systems, and the brake, when the detection signal of the body descending start detecting means shows the start of a descent of the vessel body and the body operating means is at a predetermined operative position; stores the detected value as hysteresis data; and compares a magnitude of the detected value and a rate of change with standard values on the basis of the hysteresis data when carrying out failure diagnosis of an operation and function of a respective device.

According to this device, signals from the state detecting means for detecting a temperature, a pressure and a position of each device, such as the engine, the transmission, the respective axles, the respective suspensions, the hydro-pneumatic systems and the brake, are inputted for carrying out predetermined failure diagnosis only when the body descending start detecting means detects the start of a descent of the vessel body and the body operating means is at the predetermined operative position. It is therefore possible to detect a state of the respective device securely under fixed conditions, and hence to improve the reliability of the diagnosis.

BEST MODES FOR CARRYING OUT THE INVENTION

Referring to FIGS. 1 through 4, an embodiment according to the present invention will be described.

Figure 1:
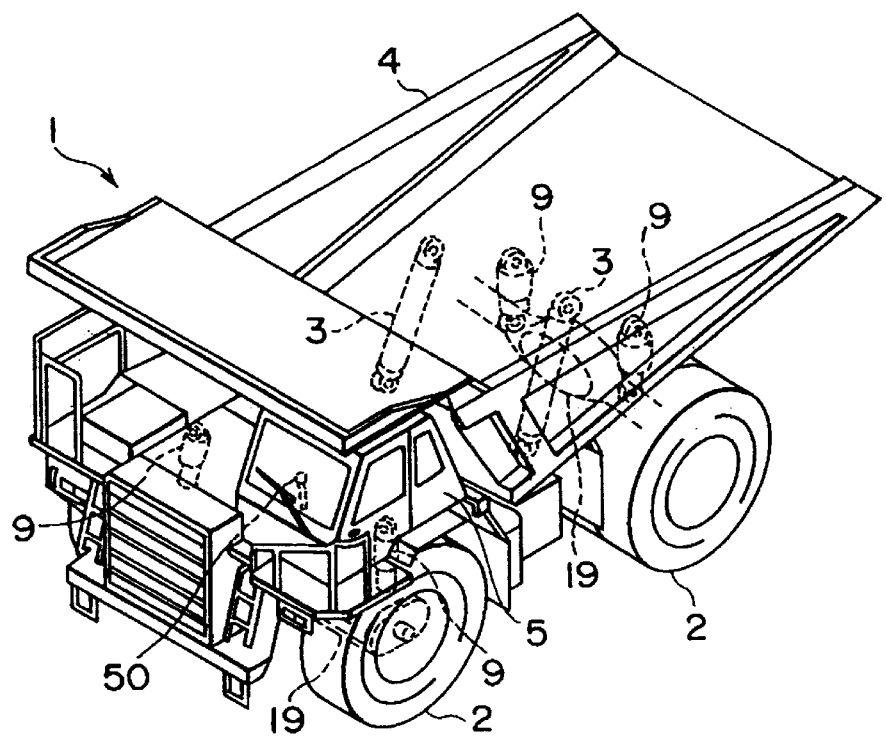
FIG. 1 is a perspective view of a dump truck which is provided with a failure diagnosis device according to the present invention.

As shown in FIG. 1, a dump truck 1 includes a car body with respective rotatable wheels 2, a vessel body 4, which can load material and which can ascend and descend, and hoist cylinders 3, 3 respectively provided on the right and the left sides of the car body for raising and lowering the vessel body 4. Respective axles 19 for supporting the respective wheels 2, and respective suspensions 9 for absorbing impact, are provided between the respective wheels and the car body. A brake, not shown, is provided for each wheel 2. An operator's cab 5 is provided on the front of the car body, and a body operating means 50 is provided in the operator's cab 5 for giving a command to raise and lower the vessel body 4. A control lever 6, such as one shown in FIG. 3, can be cited as an example of the body operating means 50.

Figure 2:
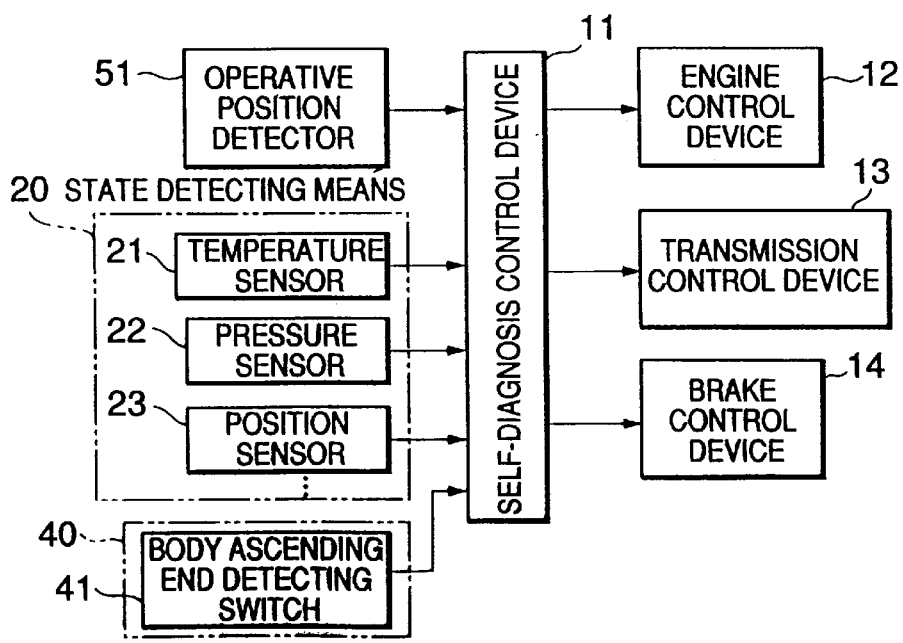
FIG. 2 is a block diagram showing the structure of a failure diagnosis device according to the present invention.

FIG. 2 is a block diagram showing the structure of a failure diagnosis device according to the present invention.

A self-diagnosis control device 11 can be a computer system mainly constituted by a microcomputer. The body operating means 50 is provided with an operative position detector 51 for detecting an operative position, i.e., an ascending position, a descending position, or a float position. The body operating means 50 is not limited to the control lever 6, and can be other means such as a push-button switch. The operative position detector 51 can be such a limit switch that it will operate according to the operative position, or a potentiometer for detecting an operative amount from the neutral position of the control lever 6.

Further, body descending start detecting means 40 is provided for detecting the start of a descent of the vessel body 4. In the embodiment, the body descending start detecting means 40 is a body ascending end detecting switch 41 for detecting that the vessel body 4 is at the end of an ascending operation. In other words, it judges that the vessel body 4 starts descending when the vessel body 4 starts moving from the ascending end portion. However, the body descending start detecting means 40 is not limited to the body ascending end detecting switch 41, and other methods can be used for detecting the start of a descent of the body 4. For example, a loading weight value can be detected so that a completion of evacuating soil, i.e., the start of a descent of the vessel body, can be judged when the loading weight value becomes equal to an empty car state.

An engine control device 12 controls an engine, not shown, to run at a predetermined engine rotational speed, on the basis of a rotational speed command from the self-diagnosis control device 11. A transmission control device 13 controls a transmission, not shown, on the basis of a gear shifting command from the self-diagnosis control device 11. A brake control device 14 actuates the brake to brake the vehicle on the basis of a braking command from the self-diagnosis control device 11. The self-diagnosis control device 11 takes in a detection signal from the operative position detector 51 to output predetermined commands to the engine control device 12, the transmission control device 13, and the brake control device 14 when the body operating means 50 is at a predetermined operative position.

State detecting means 20 detects a state of each device in the dump truck 1 such as the engine, the transmission, the respective axles 19, the respective suspensions 9, the hydro-pneumatic systems, and the brake. The state detecting means 20 can be constituted of a temperature sensor 21, a pressure sensor 22, and a position sensor 23. For example, the state detecting means 20 can detect conditions of the engine such as oil temperature, oil pressure, rotational speed, blowby pressure, exhaust temperature, and oil level, and conditions of the transmission such as oil temperature, oil level, and clutch intermittent running measurement time. With the brake, it detects a condition of wear of the brake, an abnormal wear condition, and the like, from the amount of stroke of a piston on which an inner disk, not shown, is pressed so that a braking force can be produced. With the respective suspensions 9, it can detect conditions such as the values of the pressure applied on the respective suspensions 9 in the empty car state. These state detected values are inputted from the respective sensors 21, 22, and 23 to the self-diagnosis control device 11, and stored as hysteresis data in respective predetermined storage areas of the self-diagnosis control device 11. The self-diagnosis control device 11 calculates a magnitude of each state detected value and a rate of change on the basis of the hysteresis data to compare the calculated values with corresponding reference values. The comparison results are used to detect an abnormality, to predict a generation of failure, and to investigate a true cause of failure.

Figure 3:
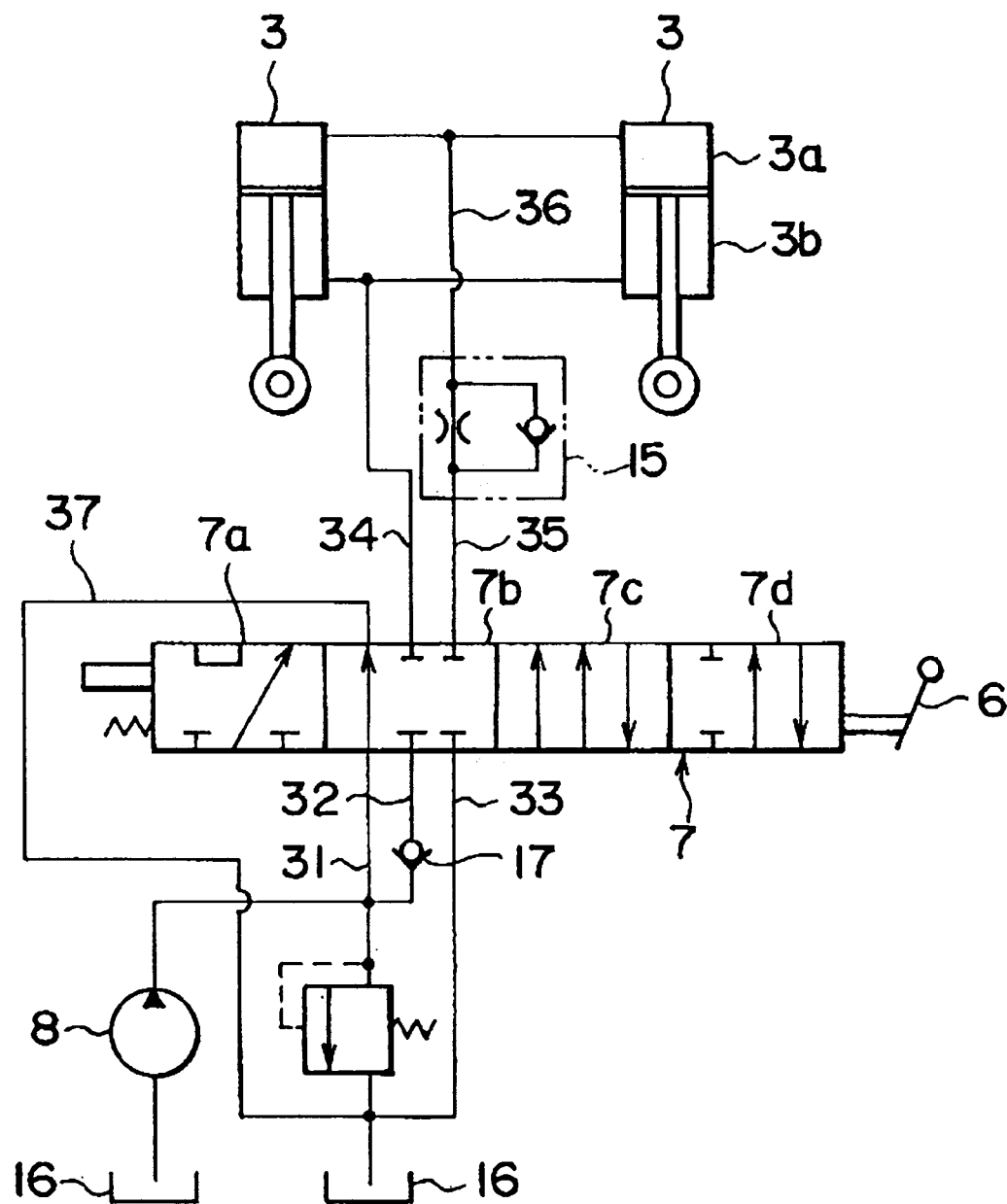
FIG. 3 is a diagram of a hydraulic circuit for raising or lowering a vessel body, which can be used with the failure diagnosis device according to the present invention.

FIG. 3 shows an example of a hydraulic circuit for the control of the raising and lowering of the vessel body according to the present invention. A direction switching valve 7 is switched in accordance with instructions from the control lever 6 or the like, so that the direction to supply the hoist cylinders 3, 3 with pressurized oil, discharged from a hydraulic pump 8, can be controlled. When the body operating means 50 is constituted by other elements than the control lever 6, such as a push-button switch, a controller, not shown, can use an electric, pneumatic or hydraulic signal to switch the direction switching valve 7 in response to an operating signal from the push-button switch.

The direction switching valve 7 has two input ports, one connected to the hydraulic pump 8 via a conduit 31 and the other connected to the hydraulic pump 8 via a conduit 32 and a check valve 17. The direction switching valve 7 also has a return port which is connected to a tank 16 via a conduit 33. Further, the direction switching valve 7 has three output ports. The first output port is connected to the tank 16 via a hydraulic 37, the second output port is connected to the bottom chambers 3b of the respective hoist cylinders 3, 3 via a conduit 34, and the third output port is connected to the head chambers 3a of the respective hoist cylinders 3, 3 via a conduit 35, a valve 15, and a conduit 36. The valve 15 is constituted of a throttle and a check valve, in which, when pressurized oil flows from the head chambers 3a, the check valve is closed so that the pressurized oil will flow through the throttle.

When the control lever 6 is at a body holding position, a spool of the direction switching valve 7 is at a center valve position or neutral position 7b, where no oil flows out from the head chambers 3a, 3a or the bottom chambers 3b, 3b of the respective hoist cylinders 3, 3, thus keeping the position of the vessel body 4. At this time, the pressurized oil from the hydraulic pump 8 drains to the tank 16 through the conduits 31 and 37. When the control lever 6 is at an ascending position, the spool of the direction switching valve 7 is at a position 7a, where the pressurized oil from the hydraulic pump 8 flows into the head chambers 3a, 3a of the respective hoist cylinders 3, 3 via the check valve 17, the conduits 32 and 35, the valve 15 and the conduit 36, and oil in the bottom chambers 3b, 3b drains to the tank 16 via the conduits 34 and 37. Thus, the hoist cylinders 3, 3 extend to raise the vessel body 4. When the control lever 6 is at a descending position, the spool of the direction switching valve 7 is at a position 7d, where the pressurized oil from the hydraulic pump 8 flows into the bottom chambers 3b of the hoist cylinders 3, 3 via the check valve 17 and the conduits 32 and 34, and oil in the head chambers 3a drains to the tank 16 via the conduit 36, the valve 15, and the conduits 35 and 33. Thus, the hoist cylinders 3, 3 contract to lower the vessel body 4. As described, when the operator sets the control lever 6 at the descending position after completion of evacuating soil, the hydraulic pump 6 is loaded under constant conditions to make the hydraulic circuit steady.

On the other hand, when the control lever 6 is at a float position, the spool of the direction switching valve 7 is at a position 7c, where most of the pressurized oil discharged from the hydraulic pump 8 drains to the tank 16 via the conduits 31 and 37, and oil in the head chambers 3a drains to the tank 16 via the conduit 36, the valve 15 and the conduits 35 and 33 because of the application of the dead load of the vessel body 4 on the hoist cylinders 3, 3. This makes the pressure in the bottom chambers 3b negative, to flow part of the pressurized oil from the hydraulic pump 8 into the bottom chambers 3b via the check valve 17. At this time, since the hoist cylinders 3, 3 contract due to the dead load of the vessel body 4 to lower the vessel body 4, no load is applied on the hydraulic pump 8. Thus, the hydraulic circuit is made steady with no load as long as other hydraulic equipment are not driven.

Figure 4:
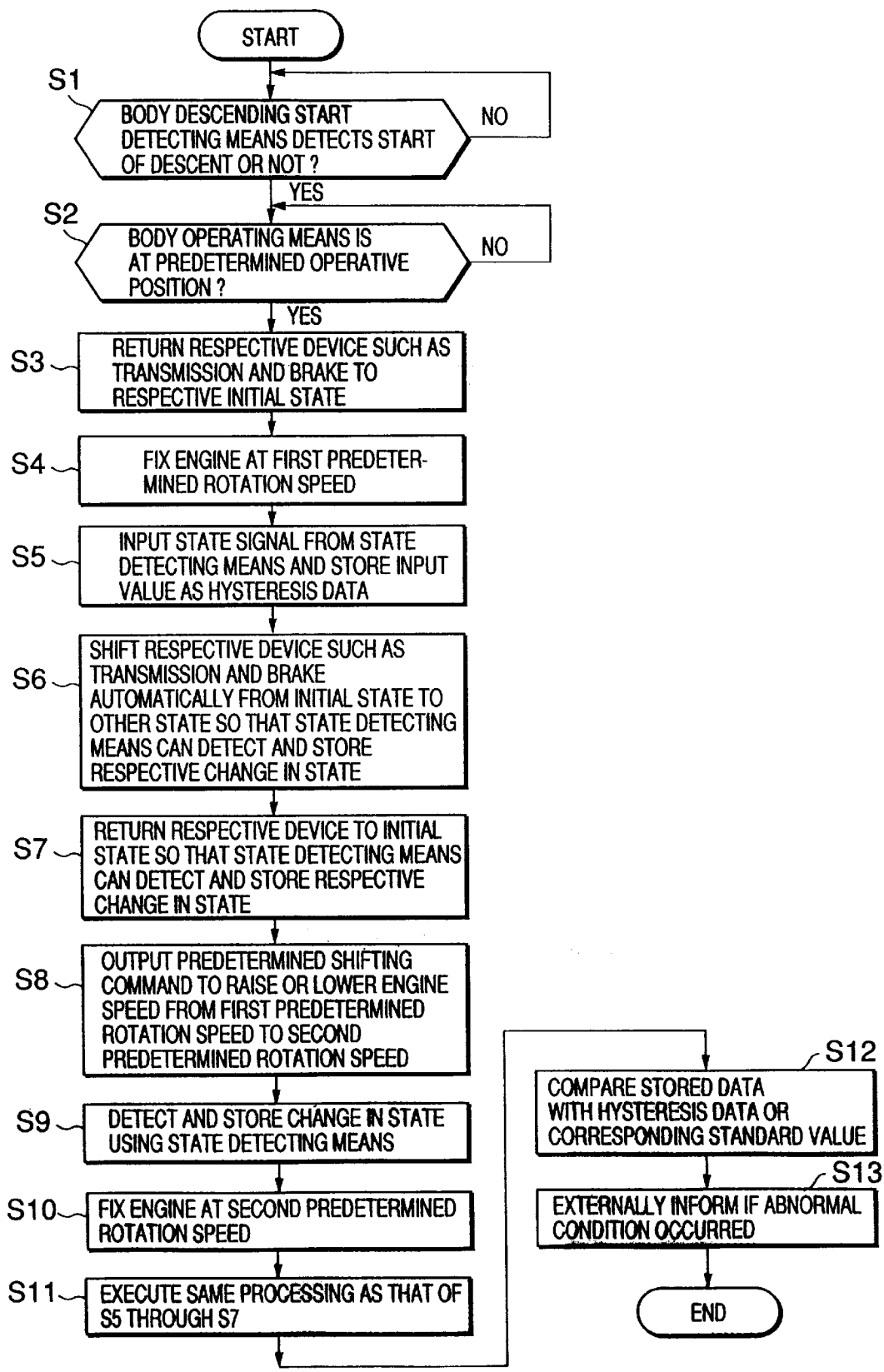
FIG. 4 is a flowchart showing processing executed by the failure diagnosis device according to the present invention.

Operation of the self-diagnosis control device 11 according to the present invention will be described along the flowchart of FIG. 4.

The failure diagnosis device make a failure diagnosis using hysteresis information in which a steady state of each device is recorded in time series. It is therefore desirable to measure the hysteresis information under identical conditions. In the embodiment, the hysteresis information is measured in a steady state in which the hydraulic circuit is actuated under constant conditions after completion of evacuating soil. As shown, each processing step is given a symbol S before each number.

In S1, it is determined whether or not the body descending start detecting means 40 detects the start of descent. The processing advances to S2 if the start of descent is detected, or Si is repeated if not. When the body descending start detecting means 40 is the body ascending end detecting switch 41, it is determined whether or not the body ascending end detecting switch 41 is switched from ON (ascending end) to OFF (descending start). If it becomes the OFF-state, the processing advances to S2. In S2, a determination is made based on the signal inputted from the operative position detector 51 as to whether or not the body operating means 50 is at a predetermined operative position at which the failure diagnosis is to be made. If it is not at the predetermined operative position S2 is repeated until the body operating means 50 comes to the predetermined operative position. The predetermined operative position denotes the float position or descending position. When the body operating means 50 comes to the predetermined operative position, respective devices such as the transmission and the brake are returned in S3 to their respective initial states for failure diagnosis. For example, the self-diagnosis control device 11 outputs a command to the transmission control device 13 to change the gearshift step to the neutral position, and outputs a command to the brake control device 14 to turn the brake on. After that, the normal diagnosis processing is executed.

At first, in S4, the self-diagnosis control device 11 outputs a rotational speed command to the engine control device 12 to fix the engine at a first predetermined rotational speed. Then, in S5, the respective state signals from the state detecting means 20 are inputted, and the state detected values are stored as hysteresis data in predetermined storage areas. Next, in S6, the self-diagnosis control device 11 outputs commands to the transmission control device 13 and the brake control device 14 to shift the respective devices, such as the transmission and the brake, automatically from their initial state to their other state, and stores the state detected values as hysteresis data while the state detecting means 20 detects changes in state at the time of shifting. After that, in S7, the respective devices, such as the transmission and the brake, are automatically shifted to their original initial state, and the state detected values are stored as hysteresis data while the state detecting means 20 detects changes in state at the time of shifting.

Next, in S8, the self-diagnosis control device 11 outputs a rotational speed shifting command to the engine control device 12 to raise or lower the engine speed from the first predetermined rotational speed to a second predetermined rotational speed. Then, in S9, the state detected value is stored as hysteresis data while the state detecting means 20 detects a change in state at the time of shifting the engine speed. In S10, the engine speed is fixed at the second predetermined rotational speed, and in S11, the same processing as described in S5 through S7 is executed.

Next, determination is made in S12 as to the presence or absence of an abnormality based on the data stored in the current diagnosis process and the hysteresis data. In other words, a rate of change is calculated from a difference between the currently stored data and the hysteresis data, while a magnitude of the currently stored data and the calculated rate of change are compared with corresponding standard values. In S13, if the comparison shows that an abnormal condition has occurred, the occurrence of abnormality is externally informed. For example, an alarm or warning is issued with a lamp or buzzer, or the contents of abnormality are sent to an external equipment or the like.

As described above, since a state of each device is detected in a predetermined steady, normal state, or a change in state is detected while shifting the state from the predetermined steady state to another steady state, each state can be measured every time under identical conditions. Further, the measured data are stored as hysteresis data, and the hysteresis data precisely represent a trend toward a state in which each device becomes an abnormal condition, thereby improving the reliability of the diagnosis, such as in detecting an abnormality, predicting an occurrence of failure, and presuming a failure portion.

Furthermore, since the diagnosis processing is executed simultaneously with normal operations of the vehicle, specific or additional work is not required for the diagnosis. It is therefore possible to prevent a reduction in the operating ratio of the vehicle, and hence a hindrance to production efficiency.

In the above flowchart, the first and second predetermined rotational speeds are preset for conditions of the engine speed, but the present invention is not limited thereto. For example, more than two steps of predetermined rotational speeds can be set, or the engine can be diagnosed at one step of predetermined rotational speed. Further, all of the processing steps in the above flowchart do not need to be executed every time. For example, only a part of the processing can be executed every time, or all the processing steps can be executed once during the predetermined number of times the diagnosis is executed.

Furthermore, the steady state of the hydraulic circuit is not limited to the state when the vessel body descends after completion of evacuating soil, and it can be a state immediately before turning off the power source after completion of all of the vehicle operations.

The steady state of the engine can be either a state when the engine is fixed at a predetermined rotational speed, or a state when the engine is shifted from the predetermined rotational speed to an other predetermined rotational speed. The predetermined rotational speed can be set to be equal to a low idling speed or a rated rotational speed, or the combination of these states can be used for measurement.

INDUSTRIAL APPLICABILITY

The present invention is effective for a failure diagnosis method and device for industrial vehicles such as dump trucks, capable of preventing generation of a failure and of diagnosing a true cause of a failure in a short period of time.

What is claimed is:

1. A method for conducting a failure diagnosis for an industrial vehicle having an engine, a transmission, at least one front axle, at least one rear axle, hydraulic systems, a brake, a vessel body, and suspensions for supporting the vessel body, said method comprising the steps of:

lowering said vessel body;

determining a state of at least one device of a group of devices including said engine, said transmission, at least one respective axle, at least one respective suspension, at least one hydraulic system, and said brake, while said vessel body is being lowered and said industrial vehicle is not in motion; and based on a thus determined state of said at least one device, diagnosing an operation and function of said at least one device.

2. A method in accordance with claim 1, wherein the step of diagnosing comprises diagnosing an operation and function of said engine at a predetermined rotational speed of said engine, while said vessel body is being lowered and said industrial vehicle is not in motion.

3. A method in accordance with claim 1, wherein the step of diagnosing comprises diagnosing an operation and function of said transmission, while said vessel body is being lowered and said industrial vehicle is not in motion.

4. A method in accordance with claim 1, wherein the step of diagnosing comprises diagnosing an operation and function of at least one of said axles, while said vessel body is being lowered and said industrial vehicle is not in motion.

5. A method in accordance with claim 1, wherein the step of diagnosing comprises diagnosing an operation and function of at least one of said suspensions, while said vessel body is being lowered and said industrial vehicle is not in motion.

6. A method in accordance with claim 1, wherein the step of diagnosing comprises diagnosing an operation and function of at least one of said hydraulic systems, while said vessel body is being lowered and said industrial vehicle is not in motion.

7. A method in accordance with claim 1, wherein the step of diagnosing comprises diagnosing an operation and function of said brake, while said vessel body is being lowered and said industrial vehicle is not in motion.

8. A method in accordance with claim 1, wherein the step of diagnosing comprises diagnosing an operation and function of each of: said engine at a predetermined rotational speed, said transmission, said axles, said suspensions, said hydraulic systems, and said brake, while said vessel body is being lowered and said industrial vehicle is not in motion.

9. A method in accordance with claim 1, wherein the step of determining a state comprises determining at least one of a temperature, a pressure, and a position for at least one of said devices.

10. A method in accordance with claim 1, wherein the step of determining is initiated by said vessel body reaching an end of an ascending operation for unloading said vessel body.

11. A failure diagnosis device for use with an industrial vehicle which has an engine, a transmission, at least one front axle, at least one rear axle, hydraulic systems, a brake, a vessel body, a body operating means, and suspensions for supporting the vessel body, wherein said vessel body can be operated by said body operating means for loading material into said vessel body and for evacuating material from said vessel body, the failure diagnosis device comprising:

state detecting means for detecting a state of at least one device of the group of said engine, said transmission, said axles, said suspensions, said hydraulic systems, and said brake, and for outputting at least one corresponding detected state signal; and a self-diagnosis control device for inputting said at least one corresponding detected state signal while the body operating means is lowering or floating said vessel body and said industrial vehicle is not in motion, for storing thus inputted detected state signals as hysteresis data, and for comparing (a) a magnitude of a value of said detected state signal and a rate of change with (b) corresponding standard values on a basis of the hysteresis data when carrying out a failure diagnosis of an operation and function of a respective one of said devices.

12. A failure diagnosis device in accordance with claim 11, further comprising body descending start detecting means for detecting a start of a descent of the vessel body; wherein, when a detection signal from the body descending start detecting means shows a start of a descent of the vessel body and the body operating means is at the descending position or the float position and said industrial vehicle is not in motion, said self-diagnosis control device inputs said at least one corresponding detected state signal, stores said at least one corresponding detected signal as hysteresis data, and compares (a) a magnitude of a value of said corresponding detected state signal and a rate of change with (b) standard values on a basis of the hysteresis data when carrying out failure diagnosis of said operation and function of said respective one of said devices.

13. An industrial vehicle comprising:

an engine;

a transmission;

at least one front axle;

at least one rear axle;

hydraulic systems;

a brake;

a vessel body;

suspensions for supporting the vessel body;

a vessel body operating means wherein said vessel body can be floated or lowered in order to provide for loading material into said vessel body, and raised in order to evacuate material from said vessel body;

state detecting means for detecting a state of at least one device of a group of said engine, said transmission, said axles, said suspensions, said hydraulic systems, and said brake, and for outputting at least one corresponding detected state signal; and a self-diagnosis control device for inputting said at least one corresponding detected state signal while the vessel body operating means is lowering or floating said vessel body and said industrial vehicle is not in motion, for storing thus inputted detected state signals as hysteresis data, and for comparing (a) a magnitude of a value of said detected state signal and a rate of change with (b) corresponding standard values on a basis of the hysteresis data when carrying out a failure diagnosis of an operation and function of a respective one of said devices.

14. An industrial vehicle in accordance with claim 13, wherein said vessel body operating means comprises means for providing a command to raise, lower, or float said vessel body; and wherein said industrial vehicle further comprises:

at least one hoist cylinder for raising and lowering said vessel body; and a direction switching valve for receiving the command from the means for providing to raise, lower, or float the vessel body, and for applying pressurized oil to said at least one hoist cylinder.

15. An industrial vehicle in accordance with claim 13, further comprising body descending start detecting means for detecting a start of a descent of the vessel body; wherein, when a detection signal from the body descending start detecting means shows a start of a descent of the vessel body, the vessel body operating means is at the descending or float position, and said industrial vehicle is not in motion, said self-diagnosis control device inputs said at least one corresponding detected state signal, stores said at least one corresponding detected signal as hysteresis data, and compares (a) a magnitude of a value of said corresponding detected state signal and a rate of change with (b) standard values on a basis of the hysteresis data when carrying out failure diagnosis of said operation and function of said respective one of said devices.

16. An industrial vehicle in accordance with claim 13, wherein the self-diagnosis control device diagnoses an operation and function of said engine at a predetermined rotational speed of said engine, while said vessel body is being lowered and said industrial vehicle is not in motion.

17. An industrial vehicle in accordance with claim 13, wherein the self-diagnosis control device diagnoses an operation and function of said transmission, while said vessel body is being lowered and said industrial vehicle is not in motion.

18. An industrial vehicle in accordance with claim 13, wherein the self-diagnosis control device diagnoses an operation and function of at least one of said axles, while said vessel body is being lowered and said industrial vehicle is not in motion.

19. An industrial vehicle in accordance with claim 13, wherein the self-diagnosis control device diagnoses an operation and function of at least one of said suspensions, while said vessel body is being lowered and said industrial vehicle is not in motion.

20. An industrial vehicle in accordance with claim 13, wherein the self-diagnosis control device diagnoses an operation and function of at least one of said hydraulic systems, while said vessel body is being lowered and said industrial vehicle is not in motion.

21. An industrial vehicle in accordance with claim 13, wherein the self-diagnosis control device diagnoses an operation and function of said brake, while said vessel body is being lowered and said industrial vehicle is not in motion.

22. An industrial vehicle in accordance with claim 13, wherein the self-diagnosis control device diagnoses an operation and function of each of: said engine at a predetermined rotational speed, said transmission, said axles, said suspensions, said hydraulic systems, and said brake, while said vessel body is being lowered and said industrial vehicle is not in motion.

23. An industrial vehicle in accordance with claim 13, wherein the state detecting means determines at least one of a temperature, a pressure, and a position for at least one of said devices.

24. An industrial vehicle in accordance with claim 13, further comprising a body ascending end detecting switch, and wherein said self-diagnosis control device is operated by a signal from said body ascending end detecting switch indicating that said vessel body has reached an end of an ascending operation for unloading said vessel body.

* * * * *